Oct. 9, 1928.
H. E. BAHNSEN
AUTOMOBILE CHAIN TIGHTENER
Filed March 16, 1927
1,687,318
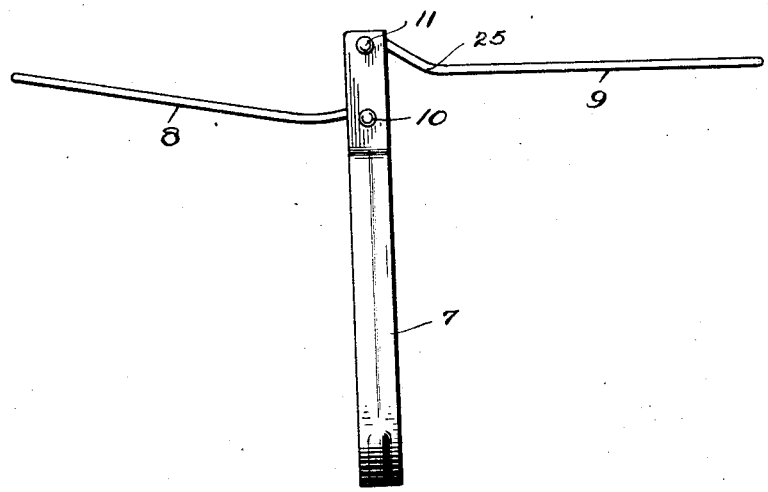
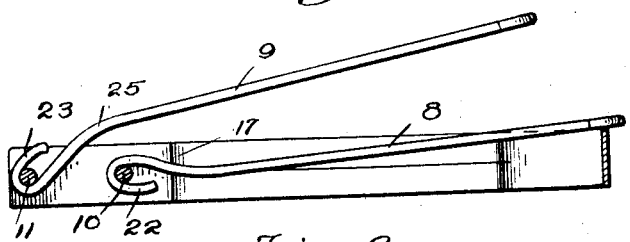
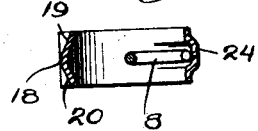
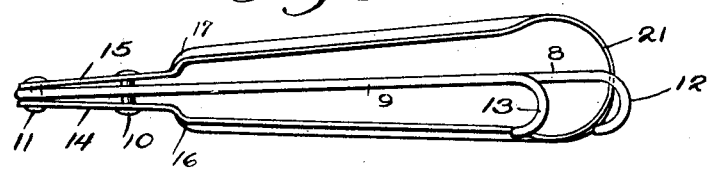
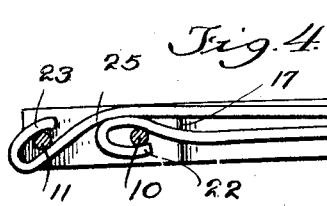
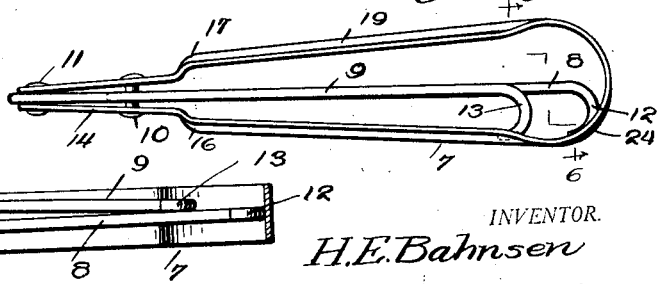
INVENTOR.
H. E. Bahnsen
BY
Mawhinney & Mawhinney
ATTORNEYS Patented Oct. 9, 1928.

1,687,318

UNITED STATES PATENT OFFICE.

HENRY E. BAHNSEN, OF HAMMOND, INDIANA.

AUTOMOBILE CHAIN TIGHTENER.

Application filed March 16, 1927. Serial No. 175,825.

The present invention relates to improvements in automobile chain tighteners, and has for an object to provide an extremely simple and compact tool for applying substantial pressure to the ends of tire chains for the purpose of bringing these ends easily to a position where the fasteners may be conveniently engaged.

Another object of the invention is to provide an automobile chain tightener in which the parts will be collapsed and foldable within small compass, where no projecting parts will be offered, and wherein the tool will be light, inexpensive to make and yet strong for the purpose intended.

With the foregoing and other objects in view, the invention will be more fully described hereinafter, and will be more particularly pointed out in the claims appended hereto.

In the drawings, wherein like symbols refer to like or corresponding parts through the several views, Figure 1 is an edge view of the tool in the spread condition ready for operation.

Figure 2 is a longitudinal section taken through the handle and showing the lever arms in partially folded condition.

Figure 3 is a top plan view of the parts in the position shown in Figure 2.

Figure 4 is a view similar to Figure 2 with the lever arms collapsed within the handle.

Figure 5 is a plan view of the device in the collapsed condition shown in Figure 4, and Figure 6 is a transverse section taken on the line 6—6 in Figure 5.

Referring more particularly to the drawings 7 designates generally a handle, and 8 and 9 lever arms pivotally secured to the handle as upon the pivot or fulcrum points, indicated at 10 and 11. The outer ends of the lever arms 8 and 9 are provided respectively with the hooks 12 and 13 for engagement with the links of the tire chain in order to draw the chain ends together when the handle 7 is swung. The handle is composed of resilient sheet metal or other appropriate material and forms a light, yet strong construction, the sheet metal strip being folded upon itself or into substantially U-shape, and having its terminal ends 14 and 15 brought close together and extending in slightly convergent relation. These terminal portions 14 and 15 are adapted to receive the rivets or pivots 10 and 11, the rivet 10 having the longer shank to span the increased distance by which the terminal ends 14 and 15 are spaced at this point. Shoulders 16 and 17 are formed at the junction of the terminal ends 14 and 15 with the side bars of the handle. Each side bar is formed substantially V-shaped in cross section, as shown in Figure 6, with the central crest part 18 and the diagonal upper and lower walls 19 and 20.

This adds strength and also presents an outer smooth surface to the hand. The yoke portion 21 of the handle which unites the wider ends of the convergent handle portions is devoid of the V-shaped construction and is of simple band metal form bent into a connecting loop for the purpose of receiving the free or hook ends 12 and 13 of the lever arms.

The connected or articulated ends of the lever arms 8 and 9 are bent into substantial loops 22 and 23 of internal oval or elongated form. The interior of the loops are considerably larger than the diameters of the pivots 10 and 11 on which the lever arms swing. This permits of a longitudinal movement of the lever arms. The outer closed ends of the loops occupy the pivots, as shown in Figure 2. In this case, however, the lever arm 8 is too long to fit within the handle, its hook portion extending over the yoke 21 of the handle. This condition appears in both Figures 2 and 3. By sliding the lever arm 8 longitudinally to the position, shown in Figures 4 and 5, the lever arm 8 will be forced down into the space encompassed by the handle; and this movement is permitted by the loose play about the pivot point 10. It will be noted that the loops 22 and 23 are opened at their inner ends, and at these ends they form constricted necks, which are narrower than the diameter of the pivot pins, so as to avoid escape of the pivot pins. However, owing to the resilient nature of the material, when the lever arm 8 is slid to the position, shown in Figure 4, the pivot pin 10 will tend to spread the sides of the loop 22. The inherent resiliency of the material combined with the curved or inclined inner walls of the loop will exert a tendency to return the lever arm 8 in the opposite longitudinal direction, which forces the end of the hook 12 tightly against the inner wall of the handle loop 21, thus effectually holding the parts together and against displacement and rattling. The hook 12 at the free end of the lever arm 8 also possesses resiliency, and it is preferable, as shown in Figure 5, to have the outer portion of the hook only engaging the yoke 21, the resilient pressure being thereby increased.

If preferred a portion of the side wall of the yoke 21 may be offset outwardly as indicated at 24 in order to provide an internal socket to receive the free portion of the hook 12, and thus resiliently lock this yieldable outer portion of the hook 12 against a movement in either direction toward the open sides of the handle. When pressure is applied by hand the hook will promptly disengage itself.

As to the lever arm 9, the loop end 23 of this lever arm is engaged in the narrower outer portion of the handle terminal ends and this lever arm is also adapted to be slid longitudinally on the pivot pin 11 with a like result to that described in connection with the loop 22 of the lever arm 8. The hook 13 of the lever arm 9 is disposed to overlap slightly one of the side members of the handle, so that in inserting this lever arm in the handle, it will be necessary to force the lever arm over laterally until the tip end of the hook 13 can avoid the side diagonal wall 19 of the handle. As the lever arm 9 is pushed downwardly, the resilient free end of the hook 13 will engage in the V-portion 18 of the handle side, and the diagonal walls 19 and 20 will avoid the upper or downward casual movement of this lever arm. The lever arm 9 will be pushed longitudinally to the position, shown in Figures 4 and 5 for the purpose of very effectually engaging the hook 13 with the trough of the V-portion 18.

It will be further noted that the lever arm 9 is formed with the bend 25 adjacent its pivoted end for the purpose of engaging with the outer portion of the loop 22 of the companion lever arm 8, when the parts are nested within the handle, as shown in Figure 4. This bend portion 25 prevents the loop 23 and pivot pin 11 from forcing the lever arm 9 toward the right in Figure 4, although it is not so desirable to provide the resilient action in the loop 23 as in the case of the loop 22 of the other lever arm 8.

However, the engagement of the bent portion 25 on the loop 22 also permits the lever arm 9 to be put under slight tension in engaging the hook 13 in the handle, so that this tension will hold the lever arm 9 against accidental movement or rattling.

It is obvious that various changes and modifications may be made in the details of construction and design of the above specifically described embodiment of this invention without departing from the spirit thereof, such changes and modifications being restricted only by the scope of the following claims.

What is claimed is:—

1. An automobile chain tightener comprising a hollow handle having indented inner socketed portions and spaced pivots, a pair of lever arms for engaging the chain adapted to collapse in superposed position within said handle and to engage the inner socketed portions, and elongated loops on the lever arms to engage said pivots.

2. An automobile chain tightener comprising a handle of band material bent upon itself to provide side handle portions and a connecting yoke portion, said yoke and handle portions having inner socketed parts, pivots carried by said handle portions, and hooked lever arms adapted to fold upon one another within the handle and to resiliently engage the socketed parts, said lever arms having elongated resilient loops for engaging about said pivots.

3. An automobile chain tightener comprising a handle of band metal folded substantially U-shaped and having convergent side handle portions and inwardly offset convergent terminal portions, said handle also having a yoke portion with a socketed part, said side-handle portions being of substantially V-shape in cross section, pivots mounted in spaced relation in said terminal ends, hook shaped resilient lever arms adapted to fold upon one another within the handle and to engage respectively the socketed part and the V-shaped part, elongated resilient open loops on said lever arms for engaging said pivots, one of said lever arms having a bent portion for engaging the loop of the companion lever arm.

In testimony whereof I affix my signature.

HENRY E. BAHNSEN.